United States Patent
Gardner et al.

(10) Patent No.: US 10,870,273 B2
(45) Date of Patent: Dec. 22, 2020

(54) DIES INCLUDING STRAIN GAUGE SENSORS AND TEMPERATURE SENSORS

(71) Applicant: HEWLETT-PACKARD DEVELOPMENT COMPANY, L.P., Spring, TX (US)

(72) Inventors: James M Gardner, Corvallis, OR (US); Berkeley Fisher, Corvallis, OR (US); Daryl E Anderson, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/619,172

(22) PCT Filed: Jul. 18, 2017

(86) PCT No.: PCT/US2017/042586
§ 371 (c)(1),
(2) Date: Dec. 4, 2019

(87) PCT Pub. No.: WO2019/017907
PCT Pub. Date: Jan. 24, 2019

(65) Prior Publication Data
US 2020/0164640 A1    May 28, 2020

(51) Int. Cl.
*B41J 2/14* (2006.01)
*B41J 2/045* (2006.01)
*G01L 1/18* (2006.01)
*B41J 29/393* (2006.01)
*G01L 1/22* (2006.01)

(52) U.S. Cl.
CPC ....... *B41J 2/04563* (2013.01); *B41J 2/04508* (2013.01); *B41J 2/04586* (2013.01); *B41J 2/14153* (2013.01); *B41J 29/393* (2013.01); *G01L 1/18* (2013.01); *G01L 1/22* (2013.01)

(58) Field of Classification Search
CPC .. B41J 2/04508; B41J 2/0458; B41J 2/04563; B41J 2/04586; B41J 2/14153; B41J 29/175; B41J 29/02; B41J 29/393; G01L 1/18; G01L 1/22
See application file for complete search history.

(56) References Cited

U.S. PATENT DOCUMENTS 4,364,059 A   12/1982  Nagayama
5,623,297 A    4/1997  Austin et al.
(Continued)

FOREIGN PATENT DOCUMENTS

JP   2012143934   8/2012
WO  WO-2010089234  8/2010

OTHER PUBLICATIONS

Zlebic, C et al., Inkjet Printed Resistive Strain Gages on Flexible Substrates, Mar. 2016, pp. 89-100 http://www.doiserbia.nb.rs/img/doi/0353-3670/2016/0353-36701601089Z.pdf.

*Primary Examiner* — Anh T Vo
(74) *Attorney, Agent, or Firm* — Dicke Billig & Czaja PLLC

(57) ABSTRACT

A die includes a plurality of fluid actuation devices and at least one strain gauge sensor to sense strain. The die also includes at least one temperature sensor to sense the temperature of the die to compensate for a temperature component of the sensed strain.

15 Claims, 8 Drawing Sheets

(56) References Cited

U.S. PATENT DOCUMENTS

| | | | |
|---|---|---|---|
| 5,831,643 A * | 11/1998 | Chung | B41J 2/04528 |
| | | | 347/17 |
| 5,945,605 A | 8/1999 | Julian et al. | |
| 6,234,599 B1 * | 5/2001 | Ishinaga | B41J 2/0451 |
| | | | 347/14 |
| 6,260,941 B1 | 7/2001 | Su et al. | |
| 6,474,769 B1 * | 11/2002 | Imanaka | B41J 2/04541 |
| | | | 347/19 |
| 6,540,316 B1 * | 4/2003 | Imanaka | B41J 2/04515 |
| | | | 347/14 |
| 6,565,172 B2 * | 5/2003 | Huang | B41J 2/14137 |
| | | | 347/17 |
| 6,739,199 B1 | 5/2004 | Nikkel | |
| 6,786,572 B2 | 9/2004 | Imanaka et al. | |
| 2013/0072084 A1 | 3/2013 | Hudson et al. | |
| 2015/0016487 A1 | 1/2015 | Britton et al. | |
| 2016/0001550 A1 | 1/2016 | Huang et al. | |

* cited by examiner

DIES INCLUDING STRAIN GAUGE SENSORS AND TEMPERATURE SENSORS

BACKGROUND

An inkjet printing system, as one example of a fluid ejection system, may include a printhead, an ink supply which supplies liquid ink to the printhead, and an electronic controller which controls the printhead. The printhead, as one example of a fluid ejection device, ejects drops of ink through a plurality of nozzles or orifices and toward a print medium, such as a sheet of paper, so as to print onto the print medium. In some examples, the orifices are arranged in at least one column or array such that properly sequenced ejection of ink from the orifices causes characters or other images to be printed upon the print medium as the printhead and the print medium are moved relative to each other.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

It is desirable to be able to determine the strain at points on a semiconductor die, such as a die including fluid actuation devices (e.g., a fluid ejection die), in the presence of a varying temperature. A varying temperature, however, may affect the output from strain gauge sensors. Accordingly, described herein is a die including at least one strain gauge sensor integrated within the die. The at least one strain gauge sensor senses the strain within the die at the location of the at least one strain gauge sensor. The die also includes at least one temperature sensor to sense the temperature of the die at the location of the at least one strain gauge sensor. The temperature at the at least one strain gauge sensor may be sensed directly by a temperature sensor or interpolated from a plurality of sensed temperatures from a plurality of temperature sensors. The sensed temperature is used to compensate for a temperature component of the sensed strain.

Figure 1A:
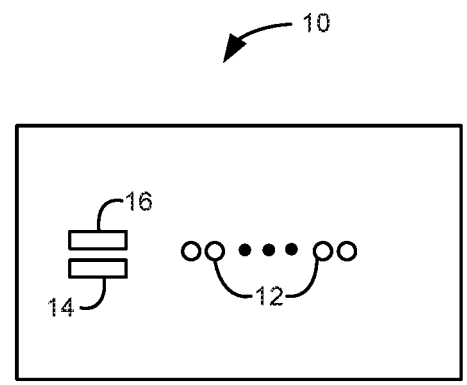
FIG. 1A is a block diagram illustrating one example of a die.

FIG. 1A is a block diagram illustrating one example of a die 10. Die 10 includes a plurality of fluid actuation devices 12, at least one strain gauge sensor 14 to sense strain, and at least one temperature sensor 16. The at least one temperature sensor 16 senses the temperature of die 10 to compensate for a temperature component of the sensed strain. In one example, the at least one strain gauge sensor 14 includes a piezoresistive sensor element, as will be described in detail below with reference to FIG. 2A. In another example, the at least one strain gauge sensor 14 includes three piezoresistive sensor elements in a rosette configuration, as will be described in detail below with reference to FIG. 2B.

In one example, the at least one temperature sensor 16 includes a diode, a thermistor, a thermocouple, a silicon bandgap temperature sensor, or another suitable temperature sensor. In another example, the at least one temperature sensor 16 may include a further strain gauge sensor. The further strain gauge sensor 16 may include four piezoresistive sensor elements in a Wheatstone bridge configuration (as will be described in detail below with reference to FIG. 3B) co-located with the at least one strain gauge sensor 14. In this case, the sensed temperature is based on the difference in the sensed strain between the at least one strain gauge sensor 14 and the further strain gauge sensor 16.

In another example, the at least one temperature sensor 16 includes a further strain gauge sensor including three piezoresistive sensor elements in a rosette configuration at a location of the fluid ejection die having substantially no stress. Since the output of the further strain gauge sensor 16 is not affected by stress, the output of the further strain gauge sensor 16 provides an indication of temperature. Accordingly, in this case, the sensed temperature is based on the difference in the sensed strain between the at least one strain gauge sensor 14 and the further strain gauge sensor 16.

Figure 1B:
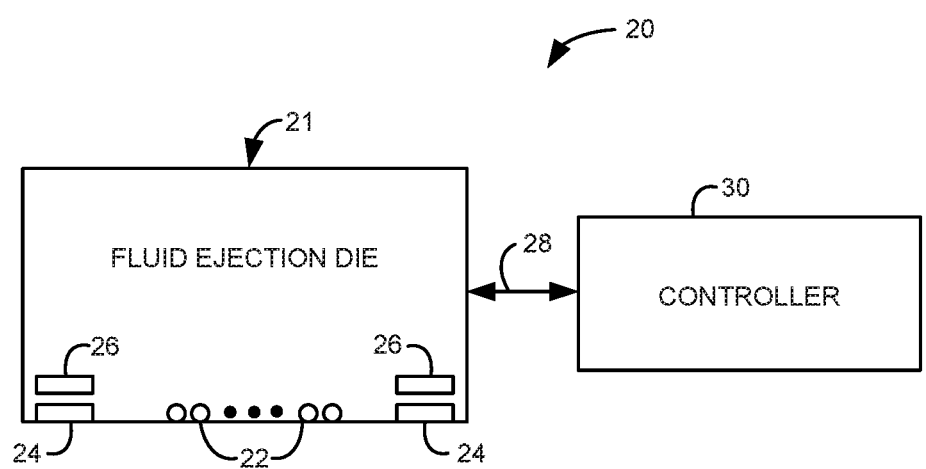
FIG. 1B is a block diagram illustrating one example of a fluid ejection system.

FIG. 1B is a block diagram illustrating one example of a fluid ejection system 20. Fluid ejection system 20 includes a fluid ejection die 21 and a controller 30. Fluid ejection die 21 is electrically coupled to controller 30 through a signal path 28. Fluid ejection die 21 includes a plurality of actuation devices 22 to eject fluid drops. In one example, actuation devices 22 are nozzles or fluidic pumps to eject fluid drops. Fluid ejection die 21 also includes a plurality of strain gauge sensors 24 to sense strain within the fluid ejection die 21 and a plurality of temperature sensors 26 to sense temperature within the fluid ejection die 21. Controller 30 receives the sensed strain from each strain gauge sensor 24 and the sensed temperature from each temperature sensor 26 and provides a temperature compensated strain for each sensed strain based on the sensed temperatures.

Figure 1C:
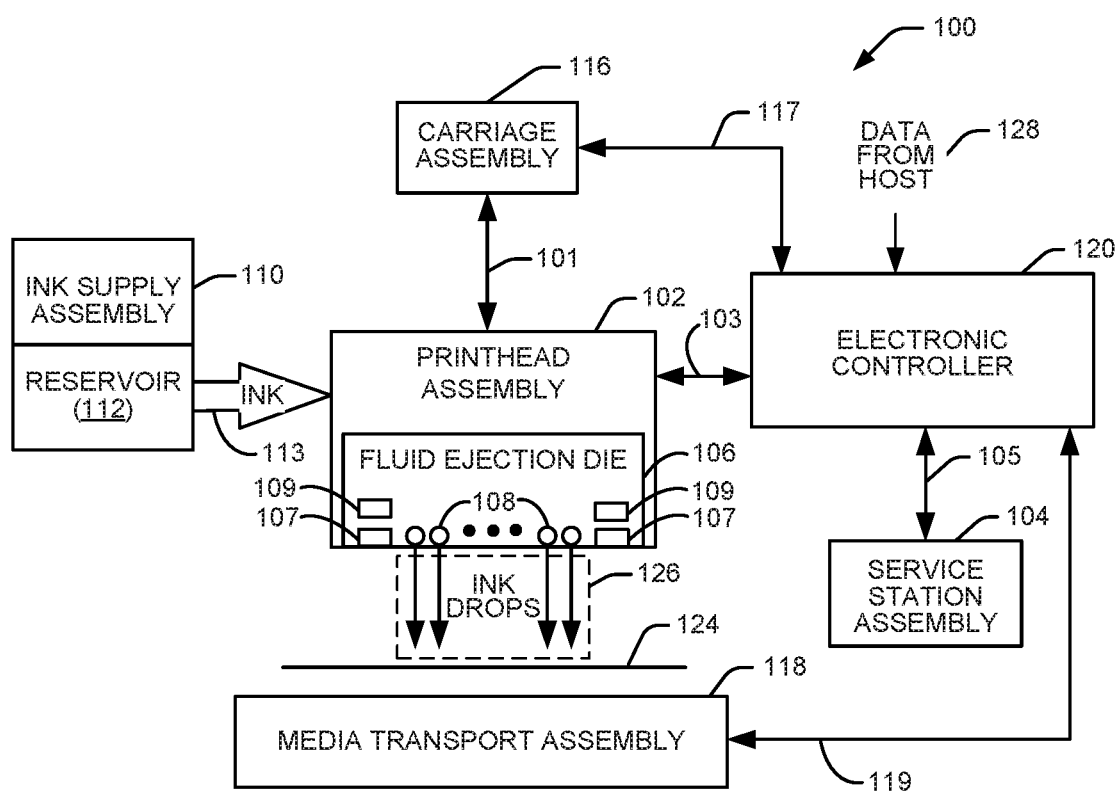
FIG. 1C is a block diagram illustrating another example of a fluid ejection system.

FIG. 1C is a block diagram illustrating another example of a fluid ejection system 100. Fluid ejection system 100 includes a fluid ejection assembly, such as printhead assembly 102, and a fluid supply assembly, such as ink supply assembly 110. In the illustrated example, fluid ejection system 100 also includes a service station assembly 104, a carriage assembly 116, a print media transport assembly 118, and an electronic controller 120. While the following description provides examples of systems and assemblies for fluid handling with regard to ink, the disclosed systems and assemblies are also applicable to the handling of fluids other than ink.

Printhead assembly 102 includes at least one printhead or fluid ejection die 106 which ejects drops of ink or fluid through a plurality of orifices or nozzles 108. In one example, the drops are directed toward a medium, such as print media 124, so as to print onto print media 124. In one example, print media 124 includes any type of suitable sheet material, such as paper, card stock, transparencies, Mylar, fabric, and the like. In another example, print media 124 includes media for three-dimensional (3D) printing, such as a powder bed, or media for bioprinting and/or drug discovery testing, such as a reservoir or container. In one example, nozzles 108 are arranged in at least one column or array such that properly sequenced ejection of ink from nozzles 108 causes characters, symbols, and/or other graphics or images to be printed upon print media 124 as printhead assembly 102 and print media 124 are moved relative to each other.

Fluid ejection die 106 also includes a plurality of strain gauge sensors 107 and a plurality of temperature sensors 109. The strain gauge sensors 107 sense strain within fluid ejection die 106. In one example, strain gauge sensors 107 enable fluid ejection system 100 to monitor the stress experienced by fluid ejection die 106. Each strain gauge sensor 107 exhibits changes in electrical conductivity when corresponding areas of fluid ejection die 106 are stressed. The amount of stress is quantified by measuring the changes in conductivity. By analyzing the stress at each corresponding area of fluid ejection die 106, numerous diagnostics may be performed. The temperature sensors 109 sense the temperature within fluid ejection die 106 at the locations of strain gauge sensors 107. The sensed temperatures are used to compensate for a temperature component of each sensed strain.

Ink supply assembly 110 supplies ink to printhead assembly 102 and includes a reservoir 112 for storing ink. As such, in one example, ink flows from reservoir 112 to printhead assembly 102. In one example, printhead assembly 102 and ink supply assembly 110 are housed together in an inkjet or fluid-jet print cartridge or pen. In another example, ink supply assembly 110 is separate from printhead assembly 102 and supplies ink to printhead assembly 102 through an interface connection 113, such as a supply tube and/or valve.

Carriage assembly 116 positions printhead assembly 102 relative to print media transport assembly 118, and print media transport assembly 118 positions print media 124 relative to printhead assembly 102. Thus, a print zone 126 is defined adjacent to nozzles 108 in an area between printhead assembly 102 and print media 124. In one example, printhead assembly 102 is a scanning type printhead assembly such that carriage assembly 116 moves printhead assembly 102 relative to print media transport assembly 118. In another example, printhead assembly 102 is a non-scanning type printhead assembly such that carriage assembly 116 fixes printhead assembly 102 at a prescribed position relative to print media transport assembly 118.

Service station assembly 104 provides for spitting, wiping, capping, and/or priming of printhead assembly 102 to maintain the functionality of printhead assembly 102 and, more specifically, nozzles 108. For example, service station assembly 104 may include a rubber blade or wiper which is periodically passed over printhead assembly 102 to wipe and clean nozzles 108 of excess ink. In addition, service station assembly 104 may include a cap that covers printhead assembly 102 to protect nozzles 108 from drying out during periods of non-use. In addition, service station assembly 104 may include a spittoon into which printhead assembly 102 ejects ink during spits to insure that reservoir 112 maintains an appropriate level of pressure and fluidity, and to insure that nozzles 108 do not clog or weep. Functions of service station assembly 104 may include relative motion between service station assembly 104 and printhead assembly 102.

Electronic controller 120 communicates with printhead assembly 102 through a communication path 103, service station assembly 104 through a communication path 105, carriage assembly 116 through a communication path 117, and print media transport assembly 118 through a communication path 119. In one example, when printhead assembly 102 is mounted in carriage assembly 116, electronic controller 120 and printhead assembly 102 may communicate via carriage assembly 116 through a communication path 101. Electronic controller 120 may also communicate with ink supply assembly 110 such that, in one implementation, a new (or used) ink supply may be detected.

Electronic controller 120 receives data 128 from a host system, such as a computer, and may include memory for temporarily storing data 128. Data 128 may be sent to fluid ejection system 100 along an electronic, infrared, optical or other information transfer path. Data 128 represent, for example, a document and/or file to be printed. As such, data 128 form a print job for fluid ejection system 100 and includes at least one print job command and/or command parameter.

In one example, electronic controller 120 provides control of printhead assembly 102 including timing control for ejection of ink drops from nozzles 108. As such, electronic controller 120 defines a pattern of ejected ink drops which form characters, symbols, and/or other graphics or images on print media 124. Timing control and, therefore, the pattern of ejected ink drops, is determined by the print job commands and/or command parameters. In one example, logic and drive circuitry forming a portion of electronic controller 120 is located on printhead assembly 102. In another example, logic and drive circuitry forming a portion of electronic controller 120 is located off printhead assembly 102.

Electronic controller 120 also receives the sensed strain from each of the plurality of strain gauge sensors 107 and the sensed temperature from each of the plurality of temperature sensors 109 to determine the temperature compensated strain at various locations within fluid ejection die 106. Electronic controller 120 may use the temperature compensated strain at the various locations within fluid ejection die 106 for numerous purposes, such as to control operations of fluid ejection system 100 or to alert a user of fluid ejection system 100 about the status of fluid ejection die 106.

Figure 2A:
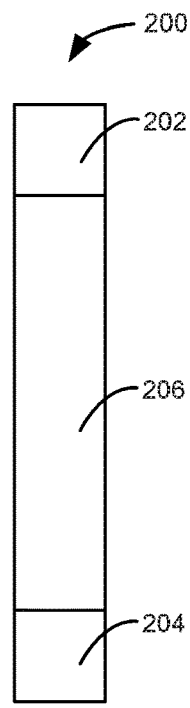
FIG. 2A illustrates one example of a strain gauge sensor.

FIG. 2A illustrates one example of a strain gauge sensor 200. In one example, strain gauge sensor 200 provides strain gauge sensor 14 of die 10 previously described and illustrated with reference to FIG. 1A, each strain gauge sensor 24 of fluid ejection die 21 previously described and illustrated with reference to FIG. 1B, or each strain gauge sensor 107 of fluid ejection die 106 previously described and illustrated with reference to FIG. 1C. Strain gauge sensor 200 includes a first electrode 202, a second electrode 204, and a piezoresistive sensor element 206 electrically coupled between first electrode 202 and second electrode 204. Piezoresistive sensor element 206 exhibits a change in resistance in response to stress in one axis. Therefore, by biasing strain gauge sensor 200 with a constant current and measuring the voltage across piezoresistive sensor element 206 or by biasing strain gauge sensor 200 with a constant voltage and measuring the current through piezoresistive sensor element 206, the strain on piezoresistive sensor element 206 may be sensed.

Figure 2B:
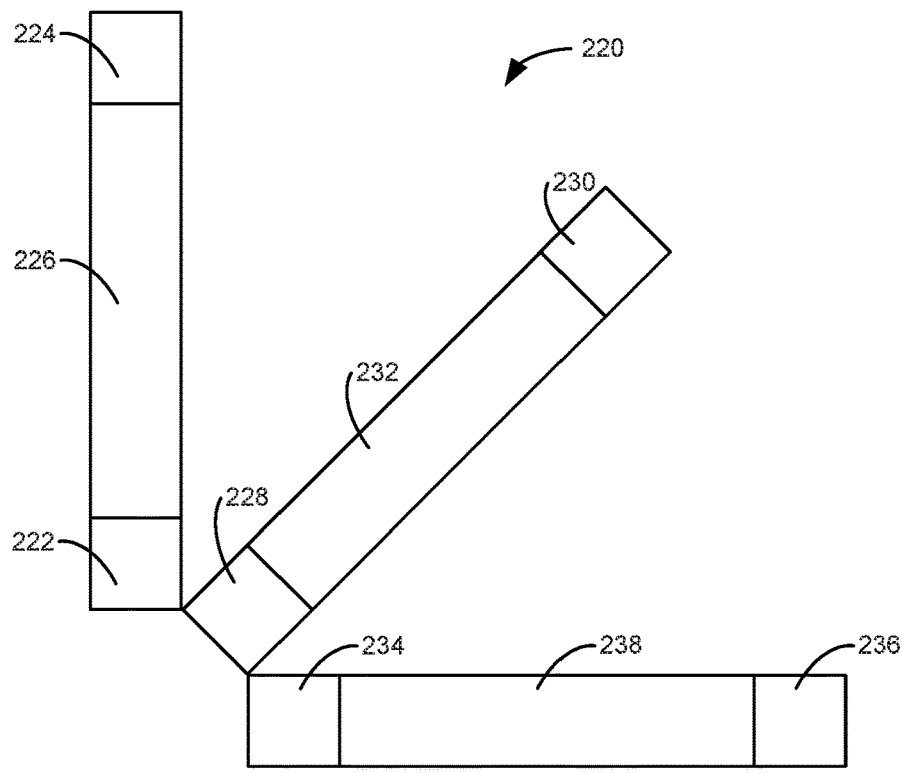
FIG. 2B illustrates another example of a strain gauge sensor.

FIG. 2B illustrates another example of a strain gauge sensor 220. In one example, strain gauge sensor 220 provides strain gauge sensor 14 of die 10 previously described and illustrated with reference to FIG. 1A, each strain gauge sensor 24 of fluid ejection die 21 previously described and illustrated with reference to FIG. 1B, or each strain gauge sensor 107 of fluid ejection die 106 previously described and illustrated with reference to FIG. 1C. Strain gauge sensor 220 includes a first electrode 222, a second electrode 224, and a first piezoresistive sensor element 226 electrically coupled between first electrode 222 and second electrode 224. Strain gauge sensor 220 also includes a third electrode 228, a fourth electrode 230, and a second piezoresistive sensor element 232 electrically coupled between third electrode 228 and fourth electrode 230. Strain gauge sensor 220 also includes a fifth electrode 234, a sixth electrode 236, and a third piezoresistive sensor element 238 electrically coupled between fifth electrode 234 and sixth electrode 236.

Strain gauge sensor 220 exhibits a change in resistance in response to stress in three directions (e.g., X, Y, and XY). Strain gauge sensor 220 is configured in a rosette configuration. Accordingly, by biasing each piezoresistive sensor element 226, 232, and 238 with a constant current and measuring the voltage across each piezoresistive sensor element 226, 232, and 238, respectively, or by biasing each piezoresistive sensor element 226, 232, and 238 with a constant voltage and measuring the current through each piezoresistive sensor element 226, 232, and 238, respectively, the strain on strain gauge sensor 220 may be sensed.

Figure 3A:
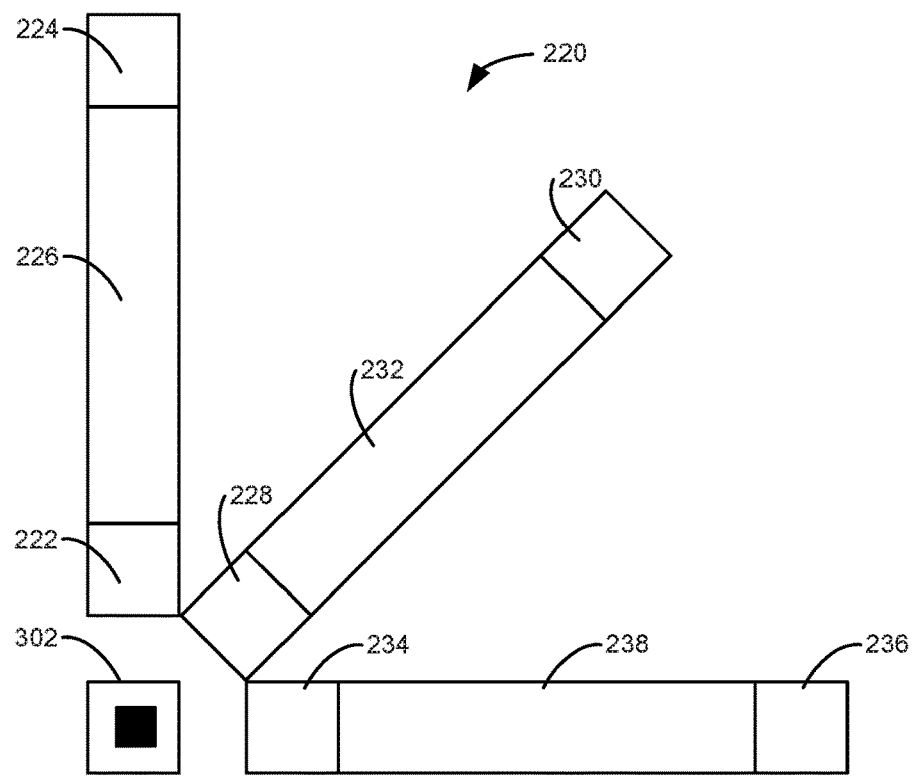
FIG. 3A illustrates one example of a strain gauge sensor co-located with a temperature sensor.

FIG. 3A illustrates one example of a strain gauge sensor 220 co-located with a temperature sensor 302. In one example, temperature sensor 302 provides temperature sensor 16 previously described and illustrated with reference to FIG. 1A, each temperature sensor 26 previously described and illustrated with reference to FIG. 1B, or each temperature sensor 109 previously described and illustrated with reference to FIG. 1C. Strain gauge sensor 220 was previously described above with reference to FIG. 2B. In this example, temperature sensor 302 is co-located with strain gauge sensor 220 adjacent to first electrode 222, third electrode 228, and fifth electrode 234. Temperature sensor 302 may be a thermistor, a thermocouple, a silicon bandgap temperature sensor, or another suitable temperature sensor.

Figure 3B:
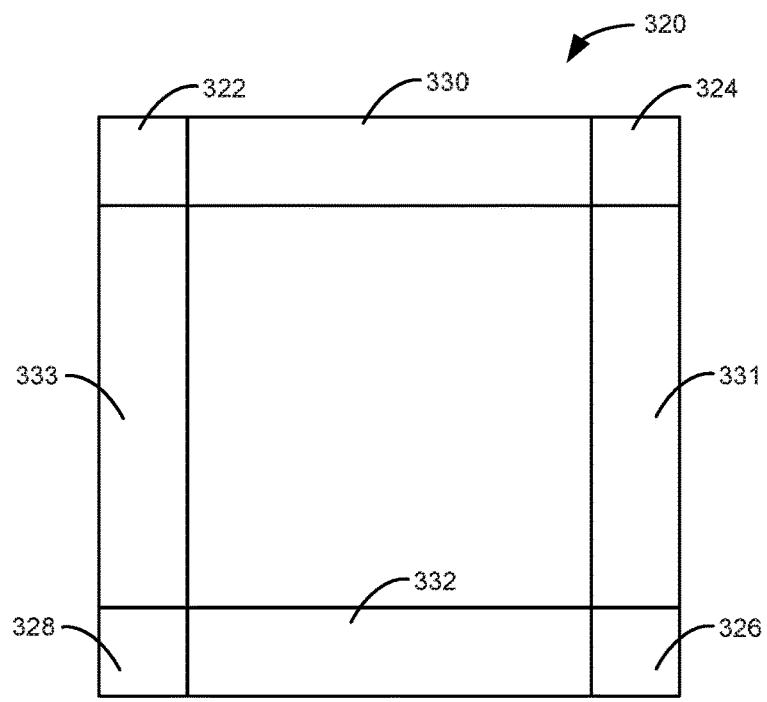
FIG. 3B illustrates one example of a strain gauge sensor used to sense temperature.

FIG. 3B illustrates one example of a strain gauge sensor 320 used to sense temperature. In one example, strain gauge sensor 320 provides temperature sensor 16 previously described and illustrated with reference to FIG. 1A, each temperature sensor 26 previously described and illustrated with reference to FIG. 1B, or each temperature sensor 109 previously described and illustrated with reference to FIG. 1C. Strain gauge sensor 320 includes a first electrode 322, a second electrode 324, a third electrode 326, a fourth electrode 328, a first piezoresistive sensor element 330, a second piezoresistive sensor element 331, a third piezoresistive sensor element 332, and a fourth piezoresistive sensor element 333. First piezoresistive sensor element 330 is electrically coupled between first electrode 322 and second electrode 324. Second piezoresistive sensor element 331 is electrically coupled between second electrode 324 and third electrode 326. Third piezoresistive sensor element 332 is electrically coupled between third electrode 326 and fourth electrode 328. Fourth piezoresistive sensor element 333 is electrically coupled between fourth electrode 328 and first electrode 322.

Strain gauge sensor 320 exhibits a change in resistance in response to stress in two axes. Strain gauge sensor 320 is configured in a Wheatstone bridge configuration in which an external biasing voltage is applied across two opposing electrodes (e.g., first electrode 322 and third electrode 326) while the voltage is measured across the other two opposing electrodes (e.g., second electrode 324 and fourth electrode 328). The Wheatstone bridge configuration is inherently temperature compensated. Therefore, by biasing strain gauge sensor 320 with an external voltage and measuring the voltage across piezoresistive sensor elements 330-333, the inherently temperature compensated strain on strain gauge sensor 320 may be sensed. The difference in the sensed stain between strain gauge sensor 320 and a non-inherently temperature compensated strain gauge sensor, such as strain gauge sensor 220 previously described and illustrated with reference to FIG. 2B, is used to determine the sensed temperature. The sensed temperature may then be used to compensate for the temperature component of the sensed strain from strain gauge sensor 220. This may be advantageous since the rosette configuration of strain gauge sensor 220 provides more information about stress direction than the Wheatstone bridge configuration of strain gauge sensor 320.

Figure 4A:
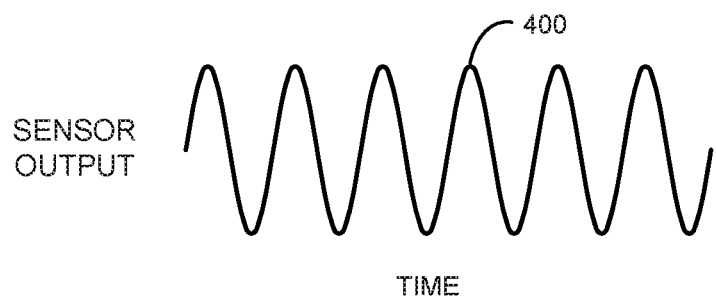
FIG. 4A illustrates one example of the output of a strain gauge sensor with no change in temperature.
Figure 4B:
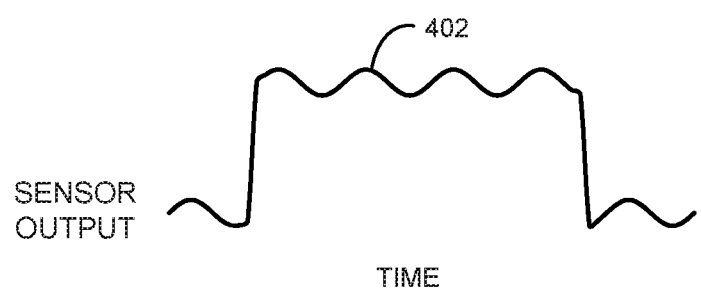
FIG. 4B illustrates one example of the output of a strain gauge sensor with varying temperature.
Figure 4C:
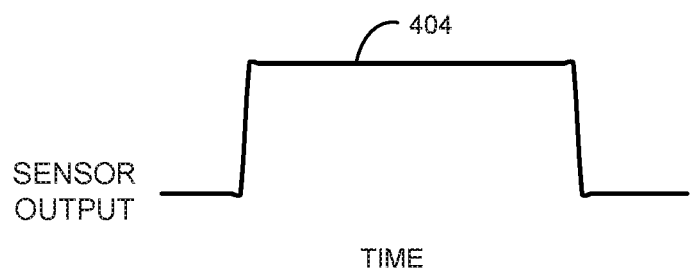
FIG. 4C illustrates one example of the output of a temperature sensor.
Figure 4D:
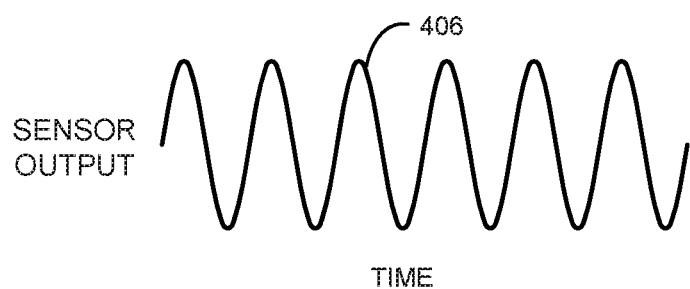
FIG. 4D illustrates one example of the temperature compensated output of a strain gauge sensor.

FIG. 4A illustrates one example of the output 400 of a strain gauge sensor with no change in temperature. In this example, the sensor output 400 is in response to the presence of an oscillating source of stress (e.g., a print carriage moving a printhead back and forth) with no change in temperature. FIG. 4B illustrates one example of the output 402 of a strain gauge sensor with varying temperature. In this example, the sensor output 402 is from the same strain gauge sensor as in FIG. 4A, but in the presence of a steep temperature change (e.g., warming as a result of printing or warming in preparation for printing). The sensed stress is overwhelmed by the change in temperature, providing an unusable signal. FIG. 4C illustrates one example of the output 404 of a temperature sensor. The temperature sensor is co-located with the strain gauge sensor providing the output signal 402 of FIG. 4B. This signal is free of strain information. FIG. 4D illustrates one example of the temperature compensated output 406 of a strain gauge sensor. The temperature compensated output 406 includes the stress information from output signal 402 of FIG. 4B with the temperature component from the temperature sensor output 404 of FIG. 4C removed from the signal.

Figure 5:
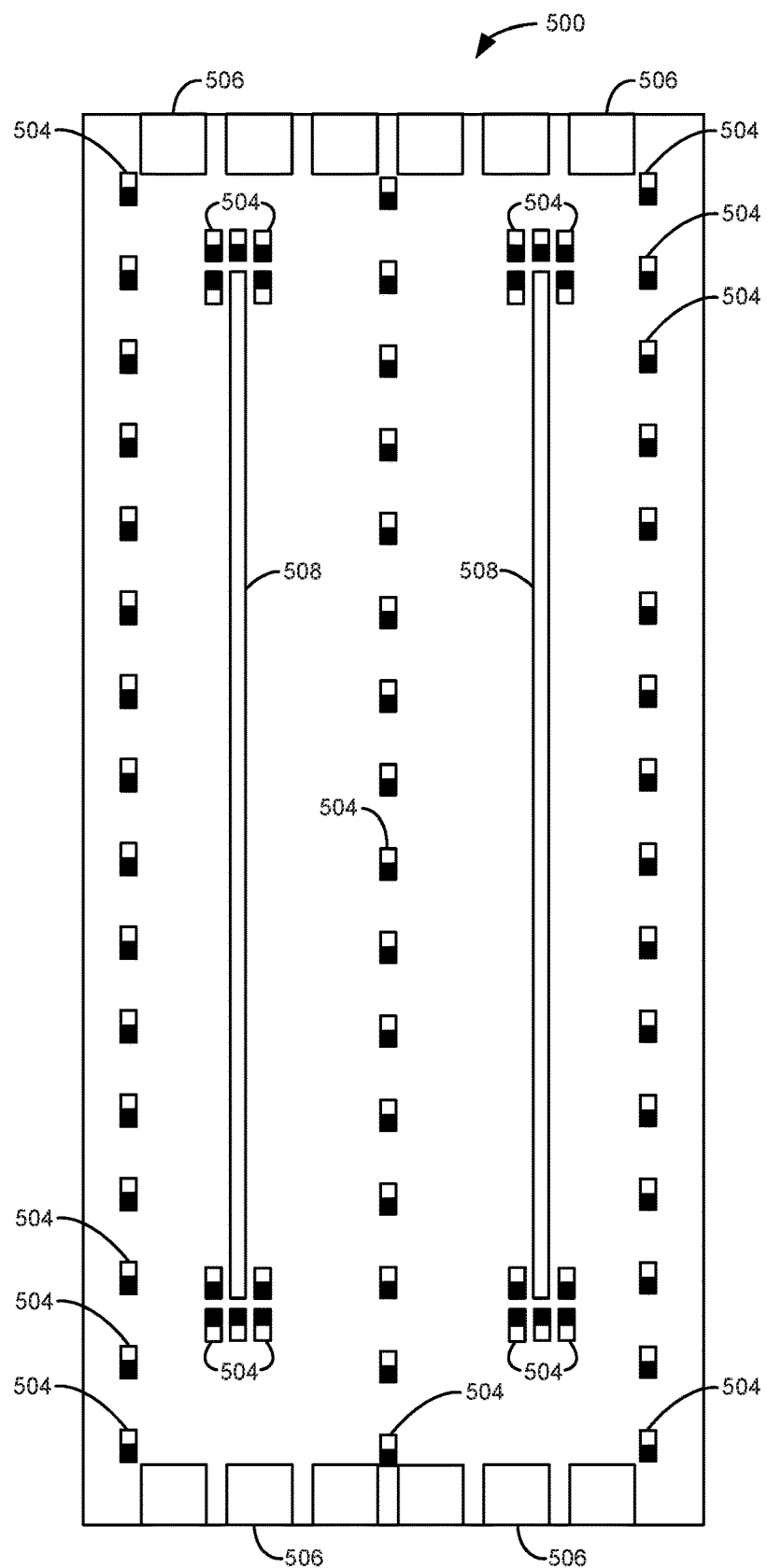
FIG. 5 illustrates a front view of one example of a fluid ejection die.

FIG. 5 illustrates a front view of one example of a fluid ejection die 500. In one example, fluid ejection die 500 provides fluid ejection die 21 previously described and illustrated with reference to FIG. 1B or fluid ejection die 106 previously described and illustrated with reference to FIG. 1C. Fluid ejection die 500 includes a plurality of strain gauge sensors co-located with a corresponding plurality of temperatures sensors as indicated by 504. In this example, each filled box of 504 indicates a strain gauge sensor and each empty box of 504 indicates a temperature sensor. Fluid ejection die 500 also includes a plurality of bond pads 506 and a plurality of slots 508. Each slot 508 delivers fluid to a plurality of corresponding nozzles (not shown) adjacent to each slot 508. In one example, fluid ejection die 500 is a silicon die and each of the plurality of strain gauge sensors and co-located temperature sensors 504 are integrated within the die. Each strain gauge sensor senses the strain within fluid ejection die 500 at a unique location within fluid ejection die 500, and each temperature sensor senses the temperature within fluid ejection die 500 at the corresponding location of each strain gauge sensor.

A plurality of strain gauge sensors and co-located temperature sensors 504 may be arranged in at least one column (e.g., three in this example) parallel to slots 508. In this example, one column of strain gauge sensors and co-located temperature sensors 504 are arranged between slots 508 in the center of fluid ejection die 500, and two columns of strain gauge sensors and co-located temperature sensors 504 are arranged on opposing sides of fluid ejection die 500. Strain gauge sensors and co-located temperature sensors 504 distributed throughout fluid ejection die 500 may be used to determine a temperature compensated strain profile or stress signature across fluid ejection die 500.

Slots 508 are arranged along the length of fluid ejection die 500 between bond pads 506. A first plurality of strain gauge sensors and co-located temperature sensors 504 surround a first end of each slot 508, and a second plurality of strain gauge sensors and co-located temperature sensors 504 surround a second end of each slot 508. In this example, five strain gauge sensors and co-located temperature sensors 504 surround each end of each slot 508. The ends of slots 508 are high stress regions within fluid ejection die 500 due to the silicon slotting process used to form the slots. The strain gauge sensors and co-located temperature sensors 504 surrounding the ends of each slot 508 monitor these regions to determine the status of fluid ejection die 500.

Bond pads 506 are arranged on a first end of fluid ejection die 500 and on a second end of fluid ejection die 500 opposite to the first end. In another example, bond pads 506 are also arranged on the side of fluid ejection die 500 instead of or in addition to the top of fluid ejection die 500. Bond pads 506 electrically couple fluid ejection die 500 to a fluid ejection system when fluid ejection die 500 is installed in the system. A plurality of strain gauge sensors and co-located temperature sensors 504 are proximate bond pads 506. In this example, six strain gauge sensors and co-located temperature sensors 504 are proximate bond pads 506 (i.e., three strain gauge sensors and co-located temperature sensors 504 proximate bond pads 506 on the first end of fluid ejection die 500 and three strain gauge sensors and co-located temperature sensors 504 proximate bond pads 506 on the second end of fluid ejection die 500). Bond pads 506 are high stress regions within fluid ejection die 500 due to electrical interconnects, bond pad encapsulants, and bond pad adhesives. The strain gauge sensors and co-located temperature sensors 504 proximate the bond pads 506 monitor these regions to determine the status of fluid ejection die 500. In other examples, strain gauge sensors and co-located temperature sensors 504 may be arranged at various other locations within fluid ejection die 500.

Figure 6:
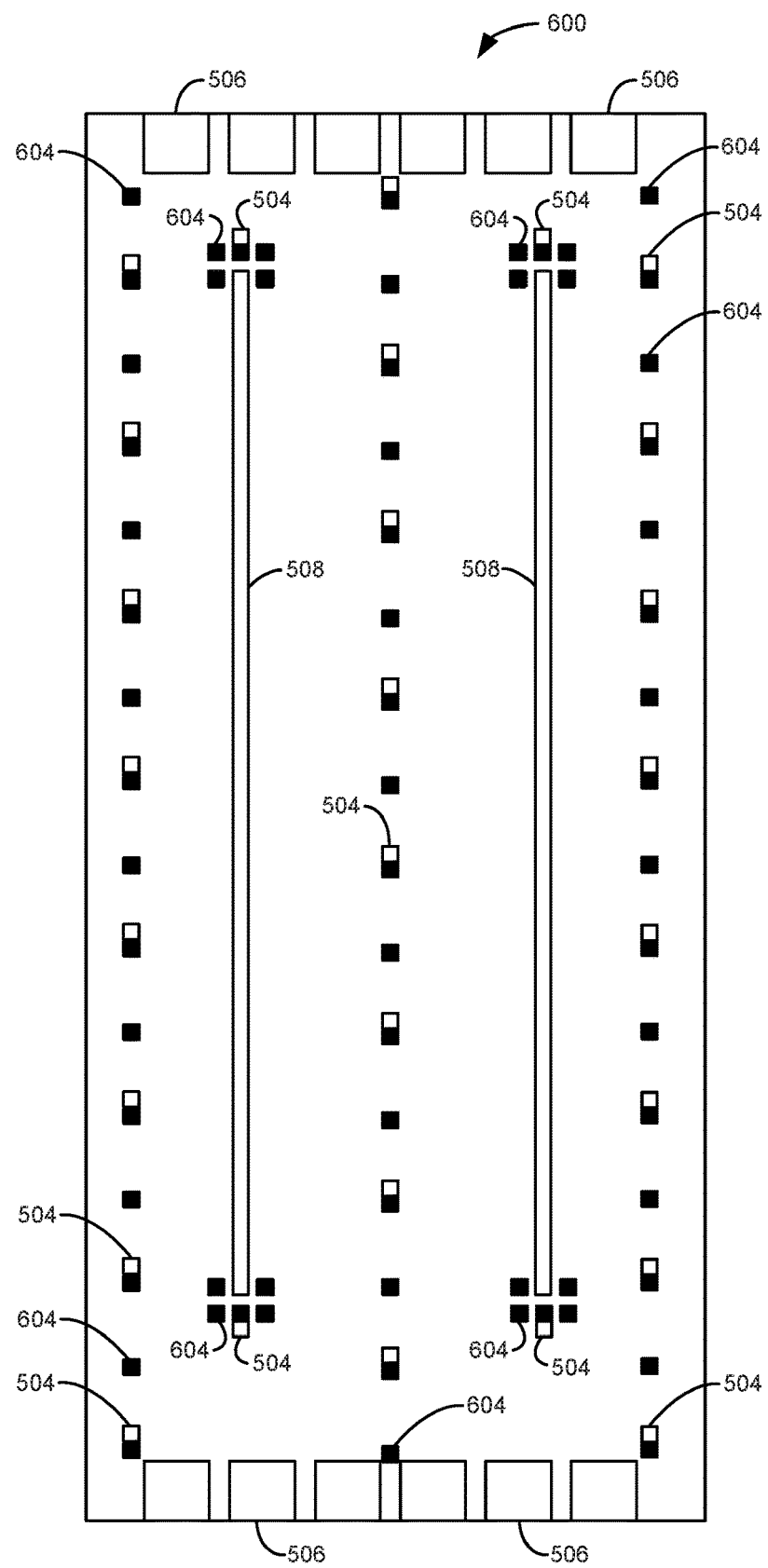
FIG. 6 illustrates a front view of another example of a fluid ejection die.

FIG. 6 illustrates a front view of another example of a fluid ejection die 600. Fluid ejection die 600 is similar to fluid ejection die 500 previously described and illustrated with reference to FIG. 5 except that in fluid ejection die 600 some strain gauge sensors and co-located temperature sensors 504 are replaced with strain gauge sensors 604, which do not include a co-located temperature sensor. In this example, fluid ejection die 600 includes more strain gauge sensors than temperature sensors. Within each column of strain gauge sensors, every other strain gauge sensor includes a co-located temperature sensor. One temperature sensor is arranged at each end of each slot 508. In this case, the sensed strain from each strain gauge sensor may be temperature compensated by using the temperature sensed from the co-located temperature sensor if present (e.g., for strain gauge sensors with co-located temperature sensors 504), from the nearest temperature sensor (e.g., for the strain gauge sensors 604 at the ends of each slot 508), or by interpolating the temperature at the location of the strain gauge sensor based on the sensed temperatures from at least two temperature sensors (e.g., for the strain gauge sensors 604 arranged in the columns).

Figure 7:
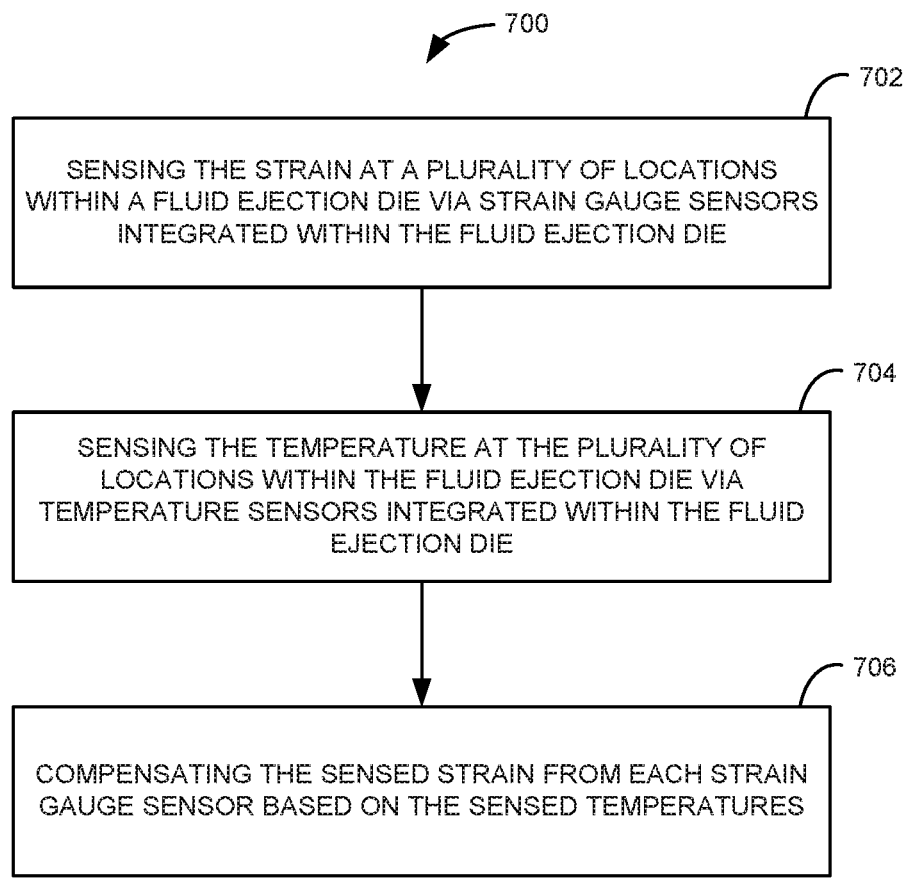
FIG. 7 is a flow diagram illustrating one example of a method for maintaining a fluid ejection system.

FIG. 7 is a flow diagram illustrating one example of a method 700 for maintaining a fluid ejection system. At 702, method 700 includes sensing the strain at a plurality of locations within a fluid ejection die via strain gauge sensors integrated within the fluid ejection die. In one example, sensing the strain includes sensing the strain in three directions at each of the plurality of locations. At 704, method 700 includes sensing the temperature at the plurality of locations within the fluid ejection die via temperature sensors integrated within the fluid ejection die. In one example, sensing the temperature includes sensing the temperature at each location within the fluid ejection die via a temperature sensor corresponding to each strain gauge sensor. Method 700 may also include interpolating the temperature at a portion of the plurality of locations based on sensed temperatures from at least two temperature sensors. At 706, method 700 includes compensating the sensed strain from each strain gauge sensor based on the sensed temperatures.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A die comprising:
a plurality of fluid actuation devices;
at least one strain gauge sensor to sense a strain within the die; and
at least one temperature sensor to sense the temperature of the die to compensate for a temperature component of the sensed strain.

2. The die of claim 1, wherein the at least one strain gauge sensor comprises a piezoresistive sensor element.

3. The die of claim 1, wherein the at least one strain gauge sensor comprises three piezoresistive sensor elements in a rosette configuration.

4. The die of claim 1, wherein the at least one temperature sensor comprises a further strain gauge sensor.

5. The die of claim 4, wherein the further strain gauge sensor comprises four piezoresistive sensor elements in a Wheatstone bridge configuration co-located with the at least one strain gauge sensor, and
wherein the sensed temperature is based on the difference in the sensed strain between the at least one strain gauge sensor and the further strain gauge sensor.

6. The die of claim 4, wherein the at least one temperature sensor comprises three piezoresistive sensor elements in a rosette configuration at a location of the fluid ejection die having substantially no stress.

7. A fluid ejection system comprising:
a fluid ejection die comprising a plurality of actuation devices to eject fluid drops, a plurality of strain gauge sensors to sense a strain within the fluid ejection die, and a plurality of temperature sensors to sense temperature within the fluid ejection die; and a controller to receive the sensed strain from each strain gauge sensor and the sensed temperature from each temperature sensor and provide a temperature compensated strain for each sensed strain based on the sensed temperatures.

8. The fluid ejection system of claim 7, wherein each strain gauge sensor comprises three piezoresistive sensor elements in a rosette configuration.

9. The fluid ejection system of claim 7, wherein the fluid ejection die comprises one temperature sensor for each strain gauge sensor.

10. The fluid ejection system of claim 7, wherein the fluid ejection die comprises more strain gauge sensors than temperature sensors.

11. The fluid ejection system of claim 7, wherein each strain gauge sensor is co-located with a temperature sensor.

12. A method for maintaining a fluid ejection system, the method comprising:

sensing a strain at a plurality of locations within a fluid ejection die via strain gauge sensors integrated within the fluid ejection die;

sensing the temperature at the plurality of locations within the fluid ejection die via temperature sensors integrated within the fluid ejection die; and compensating the sensed strain from each strain gauge sensor based on the sensed temperatures.

13. The method of claim 12, wherein sensing the strain comprises sensing the strain in three directions at each of the plurality of locations.

14. The method of claim 12, wherein sensing the temperature comprises sensing the temperature at each location within the fluid ejection die via a temperature sensor corresponding to each strain gauge sensor.

15. The method of claim 12, further comprising:

interpolating the temperature at a portion of the plurality of locations based on sensed temperatures from at least two temperature sensors.

* * * * *